United States Patent
Bell

(10) Patent No.: US 6,357,469 B1
(45) Date of Patent: Mar. 19, 2002

(54) TIRE VALVE WITH INTEGRATED PRESSURE SENSOR

(75) Inventor: Dale K. Bell, Ortonville, MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/435,382

(22) Filed: Nov. 5, 1999

(51) Int. Cl.[7] ............................................. B60C 23/00
(52) U.S. Cl. ...................... 137/224; 137/227; 152/416
(58) Field of Search ................................ 137/224, 226, 137/227, 228, 230; 152/415, 416

(56) References Cited

U.S. PATENT DOCUMENTS

| | | | |
|---|---|---|---|
| 4,754,792 A | | 7/1988 | Braun et al. |
| 4,877,048 A | | 10/1989 | Oltean et al. |
| 4,883,107 A | * | 11/1989 | Keys .......................... 152/431 |
| 4,893,664 A | | 1/1990 | Oltean |
| 4,951,501 A | * | 8/1990 | MacAnally et al. ........ 73/146.8 |
| 5,054,511 A | * | 10/1991 | Tuan et al. .................. 137/224 |
| 5,083,457 A | * | 1/1992 | Schultz .................. 73/146.8 X |
| 5,101,754 A | * | 4/1992 | Bartscher et al. ......... 116/34 R |
| 5,181,977 A | * | 1/1993 | Gneiding et al. ....... 137/226 X |
| 5,275,196 A | * | 1/1994 | Mitchell et al. ............. 137/224 |
| 5,287,906 A | | 2/1994 | Stech |
| 5,313,995 A | | 5/1994 | Schultz |
| 5,365,967 A | * | 11/1994 | Moore ......................... 137/226 |
| 5,398,744 A | * | 3/1995 | Street et al. ............ 137/230 X |
| 5,429,166 A | * | 7/1995 | Anzai et al. ................. 152/415 |
| 5,694,969 A | * | 12/1997 | DeVuyst ..................... 137/226 |
| 5,767,398 A | | 6/1998 | Naedler |
| 5,769,979 A | | 6/1998 | Naedler |
| 5,819,780 A | * | 10/1998 | Langan ....................... 137/230 |
| 5,853,020 A | * | 12/1998 | Widner ....................... 137/227 |
| 5,868,881 A | | 2/1999 | Bradley |

* cited by examiner

Primary Examiner—John Rivell
Assistant Examiner—Meredith H. Schoenfeld
(74) Attorney, Agent, or Firm—Carlson, Gaskey & Olds

(57) ABSTRACT

A vehicle wheel includes a tire that is sealed to a rim. The tire is inflated with air to a desired pressure level via a valve assembly. The valve assembly includes a valve stem with an elongated body having a central bore extending longitudinally through the body. A pressure sensor is mounted within the bore to measure the air pressure within the tire. A ball and plunger valve member is engagable and disengagable with a valve seat formed within the bore. A central tire inflation system uses the pressure sensor to monitor the tire pressure for each wheel on the vehicle. When the pressure sensor measures an air pressure in the tire that is below a desired level the central tire inflation system inflates the tire with air until the desired pressure is achieved.

20 Claims, 2 Drawing Sheets

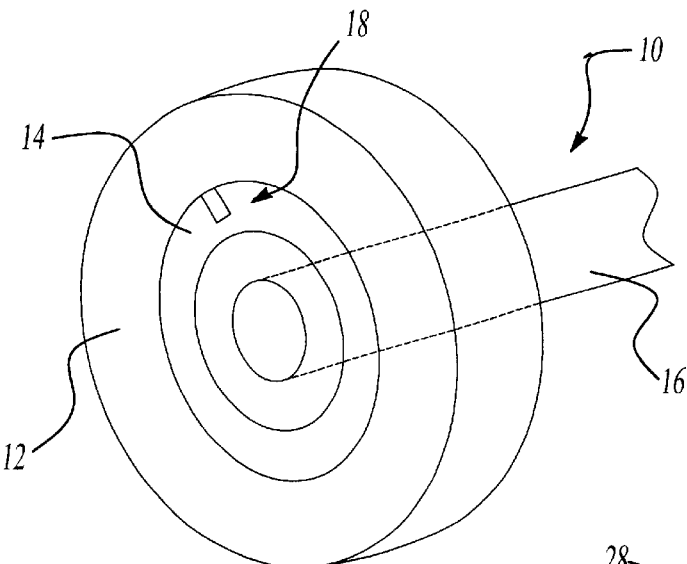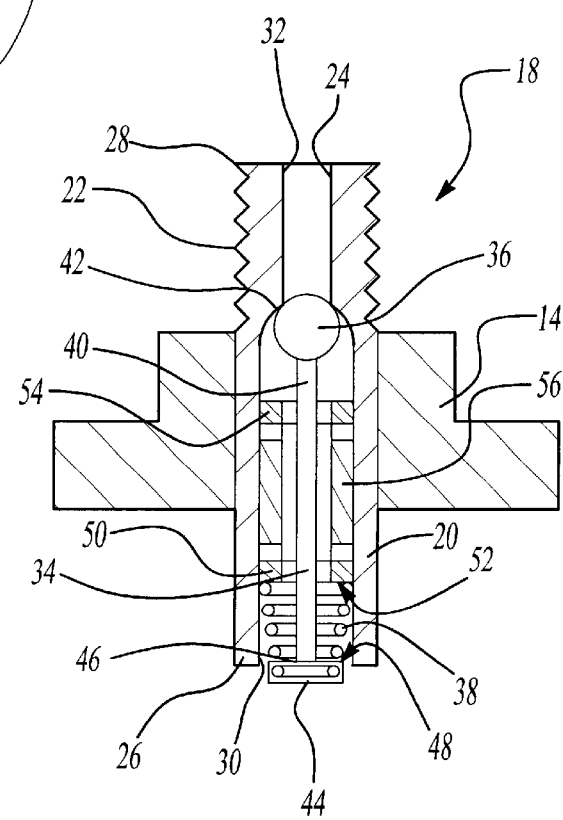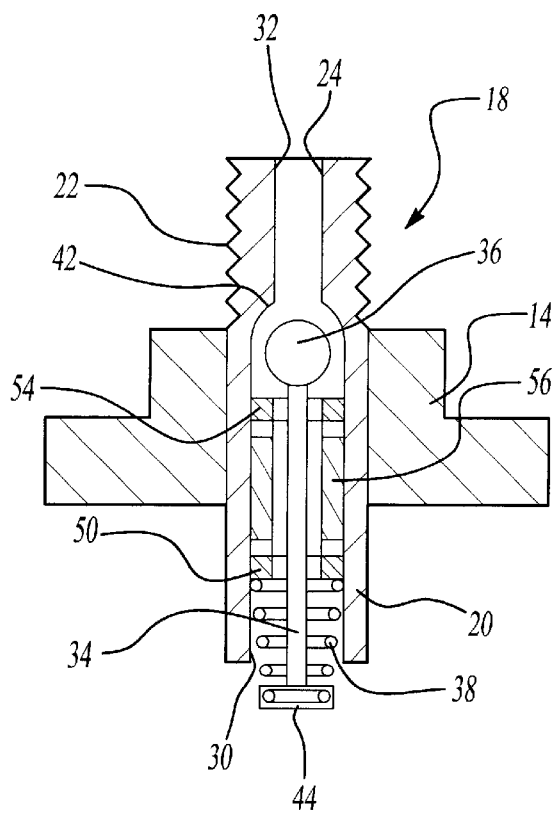
Fig-1
Fig-2
Fig-3

TIRE VALVE WITH INTEGRATED PRESSURE SENSOR

BACKGROUND OF THE INVENTION

This application generally relates to a unique tire valve assembly as used in a vehicle central tire inflation system. More particularly, the invention relates to a tire valve assembly with an integrated pressure sensor for monitoring tire pressure for the central tire inflation system.

Maintaining proper tire pressure is important for maximizing tire life. Central tire inflation systems (CTIS) are used in vehicles to maintain proper tire inflation. Various types of central tire inflation systems are known in the art. One type of system can automatically inflate tires to a desired pressure level once the tire pressure has fallen below that level. Such a system includes an air supply tank that is pneumatically connected to a pressure regulator that is set to a predetermined pressure. This regulator is pneumatically connected to each of the designated tires on the vehicle. When a pressure drop in a tire is sensed via the regulator, air flowing from the outlet of the pressure regulator is supplied to the axle having the low-pressure tire. In one known configuration, the axle has an air inlet that leads to the interior of the axle, which serves as an air conduit to a rotary seal assembly that is installed at each wheel end on the axle. The rotary seal has a stationary part that is fixed to the axle, and a rotatable part that rotates with the wheel and includes a tubular member for connection to the valve stem on the tire mounted on the rim of the wheel.

Another type of CTIS system includes the dual capability of inflating tires to a desired pressure level and deflating tires to a desired lower pressure level to accommodate off-road terrain. One such system includes an air supply tank and conduits that connect the air supply tank to a pressure regulator, an inflate valve, a deflate valve, a shut-off valve, and a quick release valve. A control system is used to move inflate, deflate, and shut-off valves between open and closed positions. The system also includes a control valve and a low-pressure shut-off valve that are pneumatically connected to the interior chamber of the tire. Pressure transducers in the conduits are used to monitor the tire pressure.

These central tire inflation systems are complex and expensive. Also, these systems have difficulty in accurately measuring the tire pressure at each of the wheels. Thus, there is a tendency to continuously maintain a higher pressure than necessary from the air supply tank to the tire, which is damaging to the system seals.

Thus, it is desirable to have a CTIS system that provides a simplified method and device for accurately measuring tire pressure at the wheel. The system should also be inexpensive and be compatible with known central tire inflation systems.

SUMMARY OF THE INVENTION

In a disclosed embodiment, a valve stem for a vehicle tire includes an elongated body having a central bore extending through the body to define a first opening at one end of the body and a second opening at an opposite end of the body. A valve seat is formed within the bore and a valve member is supported within the bore. The valve member engages the valve seat such that fluid is prevented from flowing between the first and second openings. A pressure sensor is partially received in the bore and is used to measure fluid pressure at the first opening.

In a preferred embodiment, the valve stem has a Y-shaped configuration and is used in tires for a vehicle having a central tire inflation system. Each tire has a valve stem with the pressure sensor incorporated therein to measure the tire pressure. When the tire pressure falls below a desired level, the central tire inflation system fills the tire with fluid until a desired pressure level is achieved. The Y-shaped configuration is preferred because it is compatible with central tire inflation systems while still allowing external pressure checks.

In one disclosed embodiment, a method for monitoring pressure in a tire for a central tire inflation system includes the steps of providing a vehicle tire assembly having a valve stem with a centrally extending bore, a valve member movably supported within the bore, and a valve seat for seating the valve member to prevent fluid from flowing through the bore. A pressure sensor is installed within the bore and measures tire pressure. A signal representing the tire pressure is generated and sent to a central tire inflation system controller.

The subject valve stem provides a simplified method and apparatus for measuring tire pressure for a vehicle having a central tire inflation system and for relieving air seals from pressure when air is not being added to the tire. Further, the subject valve stem is easily incorporated into any of the know central tire inflation systems. These and other features can be understood from the following specification and drawings.

BRIEF DESCRIPTION OF THE DRAWINGS

FIG. 1 is a perspective view of a wheel and axle assembly, partially cut-away, incorporating the subject valve stem.

FIG. 2 is a cross-sectional view of the valve stem in the seated position.

FIG. 3 is a cross-sectional view of the valve stem in the unseated position.

DETAILED DESCRIPTION OF THE PREFERRED EMBODIMENT

Figure 4:
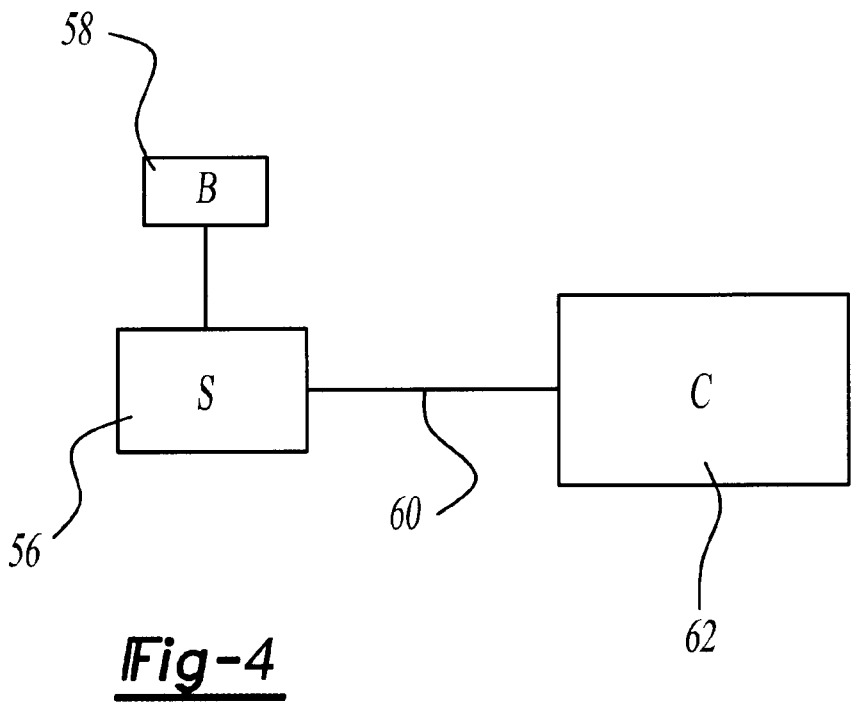
FIG. 4 is a schematic diagram the sensor and central tire inflation system.

A vehicle wheel and axle assembly is shown generally at 10 in FIG. 1. The assembly 10 includes a tire 12 that is sealed to a rim 14. The tire 12 is supported on one end of an axle 16. The axle 16 can be of any type of axle known in the art including a drive axle or non-drive axle. The axle 16 also has a tire 12 mounted on its opposite end. The axle 16 can optionally be configured to have dual tires 12 mounted at each end.

The tires 12 are typically tubular in shape and are formed from a resilient rubber material. The tires 12 are inflated with air to a desired pressure level. The desired pressure level can vary depending upon the type of terrain the vehicle will be driven on and the type of application the vehicle will perform. Typically, normal highway surfaces will require a desired pressure level of one hundred (100) pounds per square inch (psi) to one hundred and twenty (120) psi, while off-road surfaces, such as sand and mud, will require a desired pressure level of less than one hundred (100) psi.

A valve assembly, shown generally at 18, is installed in each tire 12 on the axle 16. The valve assembly 18 is preferably used on a vehicle having a central tire inflation system (CTIS). Any type of CTIS known in the art can be used with the valve assembly 18. The CTIS typically monitors tire pressure in each of the vehicle wheels and automatically supplies air to underinflated tires 12 under certain predetermined conditions until the desired pressure is achieved. Some CTIS's can also allow tires 12 to be deflated to achieve lower tire pressures for off-road surfaces such as sand or mud.

The valve 18 has a valve stem with an elongated body 20, shown in FIG. 2, which is inserted through the rim 14 and into the tire 12. Preferably, the external surface 22 of the body 20 is threaded into engagement with the rim 14, however, other attachment methods known in the art can be used.

The body 20 has a longitudinally extending central bore 24 that extends from a first end 26 to a second end 28. A first opening 30 is formed at the first end 26 and a second opening 32 is formed at the second end 28. The central bore 24 defines the first 30 and second 32 openings.

The valve 18 also includes a valve member comprised of a plunger shaft 34, a ball 36, and a spring 38. The ball 36 is preferably fixed to one end 40 of the shaft 34 with epoxy or threads between the ball 36 and shaft 34. A valve seat 42 is formed within the bore 24 and is defined by a diameter that is smaller than the diameter of the ball 36. The ball 36 engages the valve seat 42 to prevent air from flowing from the first opening 30, which is in communication with the interior of the tire 12, and the second opening 32, which is in communication with the external environment. When the spring 38 is in the normal installed position, the spring 38 resiliently biases the ball 36 against the valve seat 42, as shown in FIG. 2. When the ball 36 is unseated from the valve seat, shown in FIG. 3, the spring force is overcome and air can flow through the bore from the second opening 32 to the first opening 30 until the desired tire pressure is achieved.

The shaft 34 includes a flange 44 at an end 46 opposite from the ball 36 that provides a reaction surface 48 for the spring 38. A washer 50 is mounted within the bore 24 and provides a reaction surface 52 for the spring 38. Thus, the spring 38 interacts between the reaction surfaces 48, 52 to bias the ball 36 against the valve seat 42.

A second washer 54 is mounted apart from the first washer 50 within the bore 24. A pressure sensor 56 is mounted in the bore 24 to measure the internal air pressure of the tire 12. The pressure sensor 56 is preferably mounted between the first 50 and second 54 washers. Any type of pressure sensor known in the art can be used. The entire assembly comprising the pressure sensor 56, spring 38, shaft 34, and ball 36 is installed within the bore 24 of the valve stem. The pressure sensor 56, spring 38, and shaft 34 are preferably epoxied or molded into the valve stem body 20, however, other known attachment methods could be used.

The pressure sensor 56 is operably connected to a power source 58 and generates a signal 60 that represents the measured tire pressure, see FIG. 4. The signal 60 is sent to a controller 62 of a central tire inflation system. The power source 58 is preferably a battery or other known power source such as a piezo-electric material, which can be charged mechanically by movement of plunger shaft 34. The controller 62 is preferably a computer or other processing unit that is used to control air supply to the tires 12 based on the signals 60 received from the sensor 56.

The pressure sensor 56 is calibrated to a desired tire pressure plus the installed spring force. If the pressure in the tire 12 falls below a desired level, the controller 62 receives the signal 60 indicating that the tire pressure is too low. The controller 62 can then signal the CTIS to deliver air to the underinflated tire 12. The CTIS typically has an air tank (not shown) mounted to the vehicle that stores air for the tires 12. When the tire pressure reaches the desired level, the air supply is stopped. Preferably, the air supply is stopped when the tire pressure reaches the desired level plus the spring force plus two (2) psi. As the air pressure in the tire approaches the desired level (a level lower than the supply pressure) the valve at the tire tends to close. Once the desired pressure level is achieved, the air supply valve closes and air in the supply line is vented, allowing the spring 38 to seat the ball 36 with minimal pressure loss.

Figure 5:
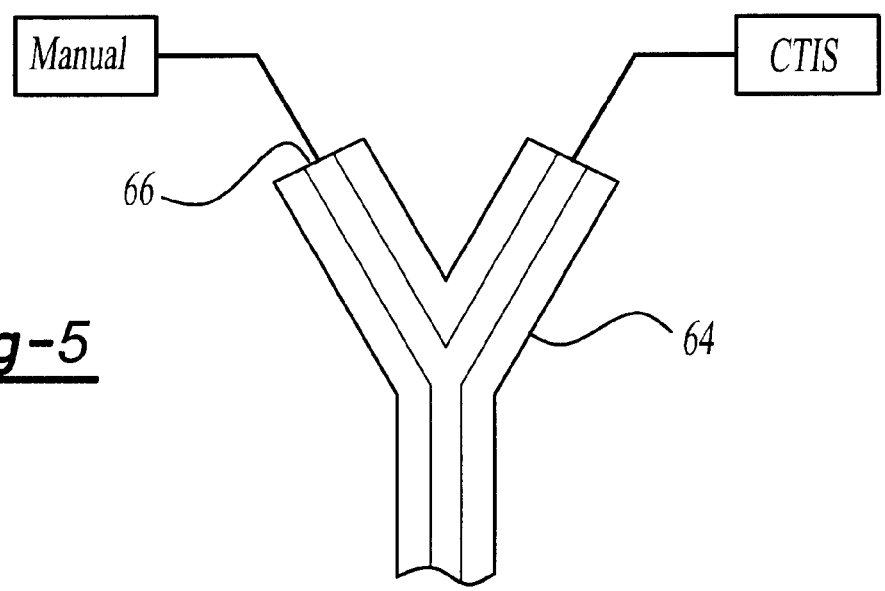
FIG. 5 is a cross-sectional view of an alternate valve stem.

Thus, when tire pressure falls beneath the desired level, the CTIS unseats the ball 36 from the valve seat 42 to allow air to flow into the tire 12. The valve stem can be a single stem configuration as shown in FIGS. 2–3, or can be a Y-type configuration 64, as shown in FIG. 5. The Y-shaped configuration is preferred because it is easily adapted to current vehicle wheels and allows for external pressure checks. It should be understood that the valve 18 would operate in the same manner for either the single or Y-shaped configuration.

While the air supply from the CTIS preferably unseats the ball 36 from the valve seat 42 to allow flow through the bore 24 to the tire 12, it should be understood that the valve 18 could also be used with a CTIS system that supplies air to the tire 12 through the axle 16. This type of CTIS includes an air passageway through the axle housing that communicates to the tire 12 through a seal assembly, as is known in the art.

Manual pressure checks can also be accomplished with the subject valve 64. When a manual pressure check is to be performed, a standard pressure gage (not shown) well known in the art, can be applied against an opening 66 at one end of the valve 64.

Preferred embodiments of this invention have been disclosed, however, a worker of ordinary skill in the art would recognize that certain modifications would come within the scope of this invention. For that reason the following claims should be studied to determine the true scope and content of this invention.

I claim:

1. A valve stem for a vehicle tire comprising:
    an elongated body having a central bore extending therethrough to define a first opening at one end of said body and a second opening at an opposite end of said body;
    a valve seat formed within said bore;
    a valve member movably supported within said bore and engagable with said valve seat to prevent fluid from flowing from said first opening to said second opening; and
    a pressure sensor partially received in said bore for measuring fluid pressure at said first opening wherein said pressure sensor generates a pressure signal representing the fluid pressure, said signal being communicated to a central tire inflation system controller, and wherein said controller causes a central tire inflation system to supply air and cause said valve member to disengage from said valve seat when the fluid pressure falls below a desired level to allow fluid flow through said bore from said second opening to said first opening.

2. An assembly as recited in claim 1 wherein said valve member is comprised of a resiliently biased plunger having a ball fixed to one end for movement therewith, said ball for engaging said valve seat.

3. An assembly as recited in claim 2 including a spring interacting between said plunger and a portion of said body such that said ball is normally biased into engagement with said valve seat.

4. An assembly as recited in claim 3 including a first washer mounted within said bore, said washer providing a reaction surface for said spring.

5. An assembly as recited in claim 4 including a second washer mounted within said bore and spaced apart from said first washer wherein said pressure sensor is located in said bore between said first and second washers.

6. An assembly as recited in claim 1 wherein said pressure sensor is operably connected to a power source.

7. A vehicle tire assembly comprising:

a rim;

a resilient tubular member filled with a fluid to a desired pressure level and sealingly engaged to said rim; and a valve incorporating a pressure sensor for monitoring fluid pressure within said tubular member wherein said pressure sensor generates a pressure signal representing the fluid pressure, said signal being communicated to a central tire inflation system controller, and wherein a controller causes a central tire inflation system to supply air and cause a valve member to disengage from a valve seat when the fluid pressure falls below a desired level to allow fluid flow through a bore from a second opening to a first opening.

8. An assembly as recited in claim 7 wherein said valve includes a valve stem having an elongated body with a central bore extending from a first end to a second end, said pressure sensor being mounted within said bore.

9. An assembly as recited in claim 8 wherein said pressure sensor is operably connected to a battery.

10. An assembly as recited in claim 9 wherein said valve includes a valve member movably supported within said bore and a valve seat formed within said bore, said valve member engaging said valve seat to prevent fluid flow through said bore.

11. An assembly as recited in claim 10 wherein said valve member is comprised of a shaft, a ball fixed to one end of said shaft, and a spring for resiliently biasing said ball into engagement with said valve seat.

12. An assembly as recited in claim 11 including a first washer mounted within said bore to provide a first reaction surface and wherein said shaft includes a flange at an end opposite from said ball that provides a second reaction surface, said spring interacting between said first and second reaction surfaces.

13. An assembly as recited in claim 12 including a second washer mounted within said bore, said pressure sensor being positioned in said bore between said first and second washers.

14. An assembly as recited in claim 13 wherein said pressure sensor generates an electric pressure signal representing fluid pressure within said tubular member and wherein said signal is communicated to a central tire inflation system controller.

15. An assembly as recited in claim 14 wherein said central tire inflation system fills said tubular member with fluid when said signal indicates that the fluid pressure in said tubular member is less than the desired pressure level.

16. A method for monitoring pressure in a tire for a central tire inflation system comprising the steps of:

providing a vehicle tire assembly having a valve stem with a centrally extending bore, a valve member movably supported within the bore, and a valve seat for seating the valve member to prevent fluid from flowing through the bore;

installing a pressure sensor within the bore;

measuring tire pressure with the sensor;

generating a signal representing the tire pressure; and sending the signal to a central tire inflation system controller.

17. A vehicle tire assembly as set forth in claim 7, wherein said controller is an electric processing unit.

18. A method as recited in claim 16 further including the step of unseating the valve member from the valve seat when the tire pressure is less than a pre-determined pressure to allow fluid to flow through the bore.

19. A method as recited in claim 18 including the step of controlling the movement of the valve member based on the signal.

20. A method as recited in claim 19 including the step of seating the valve member on the valve seat when the tire pressure achieves the pre-determined pressure.

* * * * *